June 18, 1963 H. T. BREAZEALE ET AL 3,094,156
PNEUMATIC WHEEL LOCK FOR TIRE CHANGING APPARATUS
Filed July 21, 1960 2 Sheets-Sheet 1

INVENTORS
HERSHAL T. BREAZEALE,
FRED MAY & GEORGE MAY
BY
Barnes, Kisselle, Raisch & Choate
ATTORNEYS

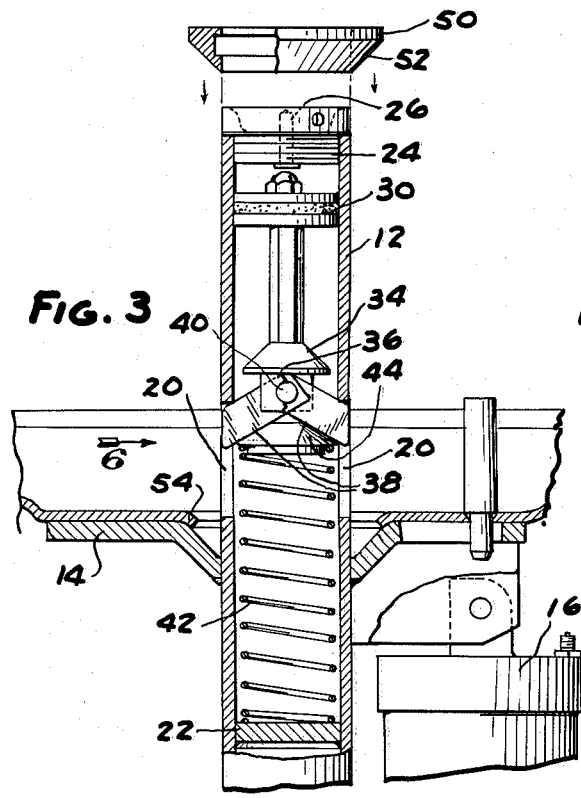
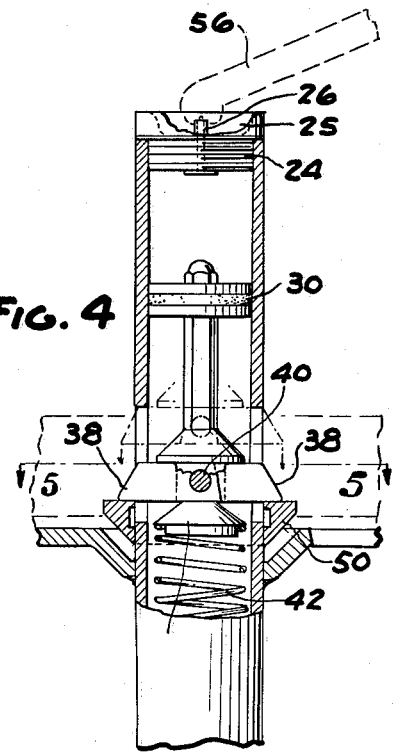
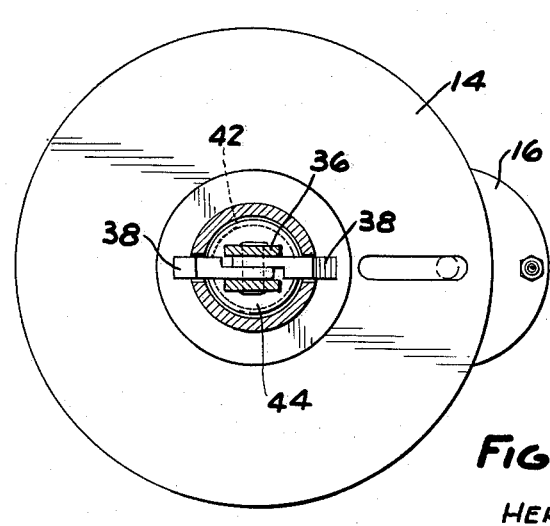
FIG. 3
FIG. 4
FIG. 5
FIG. 6
INVENTORS
HERSHAL T. BREAZEALE,
FRED MAY & GEORGE MAY
BY
Barnes, Kisselle, Raisch & Choate
ATTORNEYS

1

3,094,156
PNEUMATIC WHEEL LOCK FOR TIRE CHANGING APPARATUS
Hershel T. Breazeale, Dearborn, Fred May, Allen Park, and George May, Dearborn, Mich., assignors, by mesne assignments, to FMC Corporation, San Jose, Calif., a corporation of Delaware
Filed July 21, 1960, Ser. No. 44,341
8 Claims. (Cl. 144—288)

This invention relates to a tire changing apparatus and more particularly to a clamping means for holding the center of a wheel on a tire changing rack.

In a co-pending application, Serial Number 538,211, filed October 3, 1955, in the name of Donald D. Moore, now matured into Patent No. 2,962,065, issued on November 29, 1960, there is disclosed a general apparatus for breaking the bead of a tire and clamping the wheel to permit the tire to be removed and replaced. In this application, a replaceable ring for clamping the wheel is provided around a central post, the ring being locked on to a transverse pin projecting to each side of the post and actuated by an air piston. In each case it is necessary manually to place and lock the ring before actuation of the piston and to unlock and remove the ring after release before removal of the wheel.

The present invention contemplates an improved device for a pneumatically actuated locking unit wherein the cross pin which projects from both sides of the holding post is eliminated and a specially designed series of latches is provided which retracts upon release of the holding pressure and extends upon application of the holding pressure. Thus, upon release, the locking ring, which slides over the holding post, is readily slipped off, and the wheel can be removed without interference from any projections on the post.

Other objects and features of the invention relating to details of construction and operation will be apparent in the following description and claims.

Figure 1:
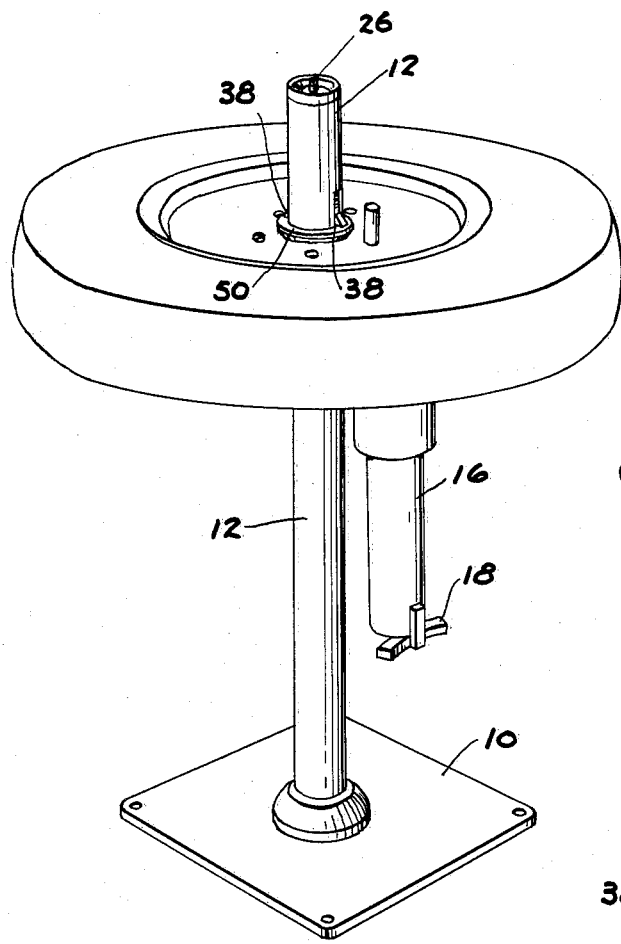

Drawings accompany the disclosure and the various views thereof may be briefly described as:

FIGURE 1, a perspective view of the general tire holding arrangement.

Figure 2:
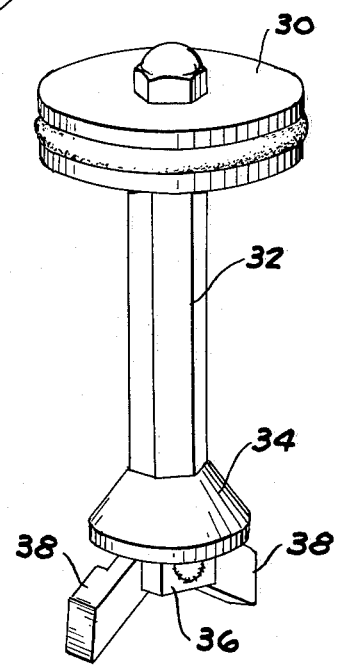

FIGURE 2, a perspective view of the actuating piston and locking means.

FIGURE 3, a sectional view showing the relationship of the parts in released position.

FIGURE 4, a sectional view showing the parts in locking position.

FIGURE 5, a sectional view on line 5—5 of FIGURE 4.

FIGURE 6, a side view of the holding post on line 6 of FIGURE 3.

Referring to the drawings: In FIGURE 1, there is shown a base 10 which can be bolted to the floor and a supporting column 12 extending vertically upward. On the column is a dished supporting flange 14 (see FIGURE 3) which serves as a resting place for the center of a wheel and which serves also as a support for a depending cylinder 16 having a bead breaker 18 on the end of the piston rod in said cylinder.

The column 12 projects upwardly through the plate 14 and has two side slots 20 positioned diametrically opposite to each other and just above the plate 14. In the column 12 just below the plate 14 is a supporting plug 22 and at the extreme upper end of the column is a sealed screw cap 24 which has a countersunk top recess 25 surrounding the nib 26 of an air valve.

Within the column is a piston 30 having a sliding sealing relation to the inside of the column which serves as a cylinder. The piston has a depending rod 32 terminating in a conical enlargement 34 having a bifurcate end 36. Mounted in the bifurcate end are overlapping dogs 38 pivotally mounted at 40 for a motion which permits the dogs to be completely recessed within the slots 20 as shown in FIGURE 3 or to splay outwardly as shown in FIGURE 4. The dogs are narrowed at the pivot end to overlap and nest in a space about equal to the full width of each dog at the outer end. They are shaped so that as retracted the outer ends are fully retracted into the slots.

Below the dogs 38 is a return spring 42 seated at the bottom on the plug 22 and carrying at its top a flat topped conical movable disc 44. The top of the disc bears upwardly against the bifurcate end of the piston rod and the proximal ends of the dogs as shown in FIGURE 3 and the pressure at the center of the dogs is overcome by the pressure at the top edges of the dog by reason of the top notches 20 to cause the dogs to retract. The conical shape of the disc 44 permits this motion as the dogs reach the top of the slots. Thus, as shown in FIGURE 3, the dogs are completely within the column. This permits the slipping on of the locking ring 50 which has a conical side surface 52 which cooperates with the periphery 54 of the opening of a wheel center.

As soon as the ring 50 is slipped on, an air nozzle 56 can be applied to the nib 26 and the pressure in the cylinder will act on the piston 30 to move the locking assembly downwardly. As soon as the dogs 38 move downwardly out of contact with the upper ends of slots 20, the pressure of the center of the conical spring disc 44 on the center of the dogs causes them to move outwardly as shown in FIGURE 4, and thus the ends of the dogs will project through slots 20 to contact the locking ring 50 to hold it tightly in engagement with the wheel center. This permits the tire to be worked on either removed, applied or repaired.

Upon release of the pressure on the piston 30, the spring 42, acting on the bifurcate end of the piston rod, will retract the piston causing the retraction of the dogs and the wheel may be lifted off along with locking ring 50. With a small wheel opening, the dogs can apply directly to the wheel but with most applications, it is preferable to use the locking ring 50 which serves as a centering device and makes the unit adaptable to varying size apertures of the wheels and applies a positive pressure circumferentially of the wheel opening.

It will thus be seen that with the above device the supporting column in the wheel is clear of all obstructions to permit easy application and removal of the wheels and the locking arrangement is extremely rigid and positive.

We claim:

1. In a wheel holding device for a tire changing and repair apparatus of the type having a supporting column, a wheel supporting flange on said column, and a hollow post adjacent said flange with a fluid-actuated piston and rod therein movable to and from a locking position, that improvement which comprises one or more slots formed in said post, one or more dogs pivotally mounted on said piston rod slidable axially and radially in said slots from a retracted to an engagement position, and resilient means to retract said fluid actuated piston from a locking position causing said dogs to be cammed with an end of said slot to a retracted position, and to move said dogs outwardly through said slots when said piston is shifted to said locking position by fluid pressure.

2. A device as defined in claim 1 in which two slots are positioned in opposed section of the wall of said post, and a pair of dogs is slidable in said slots and pivoted at a common pivot on said piston rod.

3. A device as defined in claim 1 in which two slots are diametrically positioned in the wall of said post, and a pair of dogs is slidable in said slots and pivoted at a common pivot in overlapping relation in a bifurcate portion of the piston rod.

4. A device as defined in claim 1 in which said resilient means comprises a compression spring axially opposing said piston rod and bearing against said dogs.

5. In a wheel holding device for a tire changing and repair apparatus of the type having a vertical, hollow supporting column, a fluid-actuated locking piston and rod in said column movable to and from a locking position, that improvement which comprises a bifurcate end on said piston rod, a pair of overlapping dogs pivoted on said rod at said bifurcate end, said dogs extending in opposite directions through opposed slots in the walls of said column and being extensible radially beyond said walls and retractable within said slots, a spring seat axially opposed to said piston, and a compression spring bearing against said seat and said dogs to cause retraction of said piston upon release of fluid pressure, and extension of said dogs upon actuation of said piston.

6. In a wheel holding device for a tire changing and repair apparatus of the type having a verticaly fixed supporting column, a wheel supporting flange adjacent said column, and a locking actuator in said column, shiftable to a locking position, that improvement which comprises a wall slot in said column axially adjacent said flange, a dog pivotally mounted on said actuator slidable axially and radially in said slot toward and away from said flange and having a retracted position and an extended locking position, and resiliently urged means within said column in addition to said actuator for engaging said dog when said actuator is moved to said locking position to move said dog to said extended position.

7. A device as defined in claim 6 in which the dog is pivotally mounted at the end of said actuator, and adapted to be cammed to the retracted position by contact with the top of said wall slot, and the resiliently urged means to move said dog to an extended position comprises a flat topped conical disc and a compression spring, said spring serving as a retractor for said actuator and said disc bearing at the flat topped portion against the proximal end of the dog to move it outwardly when said dog is moved by said actuator away from the top of said slot.

8. In a wheel holding device for a tire changing and repair apparatus of the type having a hollow, vertical supporting column and a wheel locking rod movable within said column to and from a locking position, that improvement which comprises at least one slot in said column, at least one dog pivotable on an end of said rod, said dog being extensible through said slot beyond said column when said rod is shifted to said locking position and retractable within said column when said rod is shifted away from said locking position, and means including a compression spring for engaging said dog to retract said rod and cause said dog to be cammed with an end of said slot into a retracted position, and to move said dog outwardly through said slot when said rod is shifted to said locking position.

References Cited in the file of this patent
UNITED STATES PATENTS

| | | |
|---|---|---|
| 1,386,249 | Gander | Aug. 2, 1921 |
| 1,896,629 | Julian | Feb. 7, 1933 |
| 1,947,957 | Tillman | Feb. 20, 1934 |
| 2,081,402 | Krema | May 25, 1937 |
| 2,471,642 | Moltz | May 31, 1949 |
| 2,530,572 | Eckles | Nov. 21, 1950 |
| 2,820,641 | Garrison et al. | Jan. 21, 1958 |
| 2,903,029 | Twilford | Sept. 8, 1959 |
| 2,962,065 | Moore | Nov. 29, 1960 |